Patented May 26, 1936

2,041,716

UNITED STATES PATENT OFFICE 2,041,716

AMINO-ORTHO-NITRO-ARYL-THIOCARBOXYLIC ACIDS, AND PROCESS OF PREPARING SAME

Arnold Kershaw, Blackley, Manchester, England, assignor to Imperial Chemical Industries Limited, a corporation of Great Britain No Drawing. Application October 29, 1934, Serial No. 750,602. In Great Britain November 9, 1933

8 Claims. (Cl. 260—109)

This invention relates to intermediate compounds for the manufacture of dyestuffs. More particularly, this invention deals with the manufacture of ortho-nitroaryl thiocarboxylic acids.

It is an object of this invention to produce novel compounds of said series, which are useful as intermediates for the manufacture of lactamizable azo dyestuffs. It is a further object of this invention to provide an improved process for the manufacture of compounds of this series. Other and further important objects of this invention will appear as the description proceeds.

The novel compounds of this invention are characterized by possessing in their structure the radical

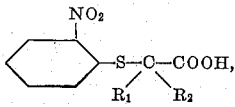

wherein $R_1$ and $R_2$ separately represent hydrogen or methyl, and wherein the entire molecule carries further a diazotizable amino group. This amino group may be attached directly to the phenyl nucleus shown, as for instance para or meta to the thio group, in which case the entire compound corresponds to the formula

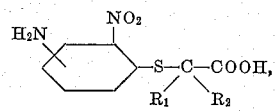

or it may be present in another aryl radical which in turn is attached to the phenyl group shown by a suitable linkage, as for instance CO—NH or $SO_2$—NH. In the latter case, the entire compound corresponds to the formula

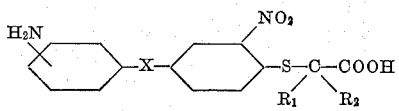

wherein X stands for an imido link such as CO—NH or $SO_2$—NH. In either case, the aryl radicals may carry further inert substituents, such as methyl, methoxy or halogen.

When $R_1$ and $R_2$ are both hydrogen, the compound is a thioglycollic acid; when one of these is hydrogen and the other is methyl, the compound is a thiolactic acid; when both letters stand for methyl, the compound is an $\alpha$-mercapto derivative of isobutyric acid.

All the compounds embraced by the above formulas have the one property in common, that they are capable of diazotization and coupling to suitable components to form azo dyestuffs which have in the diazo part of the molecule an ortho-nitro-thiocarboxylic acid group. The nitro group may then be reduced to an amino group, whereby the entire dyestuff becomes capable of lactamization on the fiber, as described more fully and claimed in copending application of Coffey, Lapworth and Sexton, Serial No. 700,016.

My improved process of preparing compounds of the above general formula comprises acting on thioglycollic acid or a derivative thereof with a nitro aromatic compound containing a replaceable halogen atom ortho to a nitro group, and containing further an amino, acylamino, or extra nitro group. The resulting condensation product is then treated with a hydrolyzing or reducing agent, as the case may be.

The following examples illustrate but do not limit my invention. The parts are by weight.

*Example I.—2-nitro-5-aminophenylthioglycollic acid*

To a mixture of 53.6 parts of 3-chloro-4-nitroacetanilide (Beilstein and Kurbatow, Ann. 182, 107 (1876)), 25 parts of thioglycollic acid, and 500 parts of methylated spirits is added a solution of 30 parts of caustic soda in 30 parts of water. The whole is then agitated and refluxed gently for 14 hours, (whereby condensation and hydrolysis takes place simultaneously) and poured into 1200 parts of water. The resulting dark solution is filtered and acidified to precipitate 2-nitro-5-aminophenylthioglycollic acid, which forms a yellow crystalline powder, melting point 192° C. and separates on recrystallization from 90% acetic acid in yellow needles, melting point 198 to 200° C.

*Example II.—4-chloro-2-nitro-5-aminophenylthioglycollic acid*

This is obtained by replacing the 3-chloro-4-nitroacetanilide in Example I by 61.2 parts of 2,5-dichloro-4-nitro-acetanilide (Beilstein and Kurbatow, Ann. 196, 224 (1879)). The acid melts at 238 to 240° C. and recrystallized from 90% acetic acid gives yellow needles, melting point 248 to 249° C.

*Example III.—2-nitro-5-amino-4-methylphenylthioglycollic acid*

This is obtained in a similar manner by the use of 57.1 parts of 4-chloro-5-nitroaceto-o-toluidine (Kenner, Todd and Witham, J. C. S., 127, 2346 (1925). It melts at 202 to 204° C. and after recrystallization from 90% acetic acid at 213 to 214° C.

*Example IV.—2-nitro-5-amino-4-methoxyphenylthioglycollic acid*

This is similarly obtained from 61.1 parts of 4-chloro-5-nitroacet-o-anisidide (D. R. P. 137, 956, A. G. fur Anilin Fabr.). It melts at 206° and after recrystallization from 90% acetic acid at 213-214° C.

*Example V.—4-chloro-2-nitro-5-aminophenyl-thiolactic acid*

This is obtained by replacing the thioglycollic acid in Example II with 29 parts of thiolactic acid (Bullmann, Ann. 348, 123 (1906)). It melts at 194 to 196° C. and after recrystallization from 90% acetic acid at 200° C.

*Example VI.—4-chloro-2-nitro-5-aminophenyl-mercaptoisobutyric acid*

This is obtained by replacing the thioglycollic acid in Example II by 33 parts of α-mercapto-isobutyric acid (Bullmann, Ann. 348, 128 (1906)). It melts at 177 to 179° C. and after recrystallization from toluene, from which it separates in bright yellow needles, at 181 to 182° C.

*Example VII.—2-nitro-5-aminophenylthioglycollic acid*

To a mixture of 17.3 parts of 3-chloro-4-nitroaniline, 10 parts of thioglycollic acid and 140 parts of methylated spirits is added a solution of 8.6 parts of caustic soda in 8.6 parts of water. The whole is agitated and refluxed gently for 16 hours. The product is isolated in the same way as when prepared from 3-chloro-4-nitroacetanilide. The melting point is 196 to 197° C., and is raised by recrystallization from 90% acetic acid to 198 to 200° C.

*Example VIII.—2-nitro-4-aminophenylmercaptoisobutyric acid*

50.5 parts of 1-chloro-2,4-dinitrobenzene, 36 parts of α-mercaptoisobutyric acid and 250 parts of pyridine are gently boiled together for 15 minutes. The resulting solution is boiled with excess of 10% hydrochloric acid, cooled, and the 2,4-dinitrophenyl-mercaptoisobutyric acid filtered off. It forms a yellow powder and on recrystallization from 30% acetic acid forms pale yellow plates, melting point 148° C.

26.6 parts of this product are dissolved in 140 parts of water by the addition of strong aqueous ammonia. The mixture is heated to 90° C., and a solution of 36 parts of sodium sulphide crystals in 40 parts of water is added over 20 minutes at 90° C. under agitation. The whole is then stirred at 90° C. for a further 15 minutes, made strongly acid with hydrochloric acid, stirred 10 minutes, filtered, cooled and treated with sufficient aqueous ammonia to precipitate the 2-nitro-4-aminophenyl-mercaptoisobutyric acid. It forms a yellow powder, which may be recrystallized from hot water in pale needles, melting point 174° C.

*Example IX.—2-nitrophenylthioglycollic acid-4-(4'-aminosulphanilide)*

To a mixture of 32.7 parts of 4-chloro-3-nitrobenzene-sulphon-4'-aminoanilide (prepared by condensing together 4-chloro-3-nitrobenzene sulphonylchloride and p-aminoacetanilide, followed by de-acetylation), 12 parts of thioglycollic acid and 400 parts of methylated spirits is added to a solution of 9.8 parts of caustic soda in 10 parts of water. The mixture is agitated and gently boiled for two hours. It is then stirred with 1,000 parts of water, filtered if necessary, and made just acid to Congo red paper. The precipitated 2-nitrophenylthioglycollic acid-4-sulphon-4'-aminoanilide is filtered off and washed with water. It has a melting point of 236° C.

*Example X.—2-nitrophenylthioglycollic acid-4 (4'-aminocarboxylic anilide)*

To a mixture of 29.1 parts of 4-chloro-3-nitrobenzoic acid-p-aminoanilide (prepared by condensing 4-chloro-3-nitrobenzoyl chloride with p-aminoformanilide, and hydrolysis of the form-amino group), 10.0 parts of thioglycollic acid and 400 parts of methylated spirits is added a solution of 8.6 parts of caustic soda in 9 parts of water. The whole is agitated and gently refluxed for two hours. The mixture is worked up in the usual manner.

It will be understood that the processes given in the above examples are merely illustrative, and are capable of wide variation and modification, without departing from the spirit of this invention.

I claim:

1. A compound possessing the structure

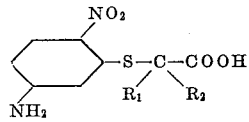

wherein R₁ and R₂ individually represent a member of the group consisting of hydrogen and methyl.

2. A compound of the general formula

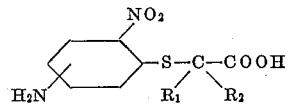

wherein R₁ represents a methyl group, while R₂ stands for a member of the group consisting of hydrogen or methyl, and wherein the phenyl nucleus may be further substituted by inert substituents, selected from the group consisting of halogen, alkyl and alkoxy.

3. A 5-amino-2-nitro-phenyl-thioglycollic acid.

4. A 5-amino-2-nitro-phenyl-thiolactic acid.

5. A 5-amino-2-nitro-phenyl-mercapto-isobutyric acid.

6. The process of producing an ortho-nitro-aryl-thiocarboxylic acid possessing further a diazotizable amino group, which comprises reacting in alkaline alcoholic medium a thioalkyl-carboxylic acid and an aromatic nitro compound containing a replaceable halogen atom ortho to the nitro group and containing further a member of the class consisting of the amino group and acylated amino groups, diluting the reaction mass with water, neutralizing with acid, and recovering the free amino-ortho-nitro-aryl-thiocarboxylic acid.

7. The process of producing an ortho-nitro-aryl-thio-carboxylic acid possessing further a diazotizable amino group, which comprises reacting thioglycollic acid with an amino-nitrobenzene compound having a halogen group ortho to the nitro group.

8. The process of producing an ortho-nitro-aryl-thiocarboxylic acid possessing further a diazotizable amino group, which comprises reacting with caustic soda upon an alcoholic mixture of thioglycollic acid and an acidylamino-nitrobenzene compound having a halogen atom ortho to the nitro group, and recovering the hydrolyzed condensation product.

ARNOLD KERSHAW.